US 8,279,222 B2

(12) United States Patent
Swaminathan et al.

(10) Patent No.: US 8,279,222 B2
(45) Date of Patent: Oct. 2, 2012

(54) PROCESSING GRAPHICS DATA FOR A STEREOSCOPIC DISPLAY

(75) Inventors: Vasanth Swaminathan, Mississauga (CA); Graham Sellers, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1237 days.

(21) Appl. No.: 12/048,969

(22) Filed: Mar. 14, 2008

(65) Prior Publication Data

US 2009/0231329 A1    Sep. 17, 2009

(51) Int. Cl.
*G06T 15/10* (2011.01)

(52) U.S. Cl. ........ 345/427; 345/419; 345/420; 345/421; 345/422; 345/581; 345/619

(58) Field of Classification Search .................... None
See application file for complete search history.

(56) References Cited

U.S. PATENT DOCUMENTS

| | | | |
|---|---|---|---|
| 6,215,495 B1 | 4/2001 | Grantham et al. | |
| 6,496,183 B1 * | 12/2002 | Bar-Nahum | 345/419 |
| 6,798,409 B2 | 9/2004 | Thomas et al. | |
| 6,887,157 B2 | 5/2005 | LeMay et al. | |
| 6,888,547 B2 | 5/2005 | Higashiyama et al. | |
| 6,965,386 B2 | 11/2005 | Appel et al. | |
| 6,982,682 B1 * | 1/2006 | Kaulgud et al. | 345/1.1 |
| 7,006,683 B2 | 2/2006 | Brand | |
| 2002/0113756 A1 * | 8/2002 | Tuceryan et al. | 345/8 |
| 2003/0001837 A1 * | 1/2003 | Baumberg | 345/419 |
| 2003/0214502 A1 | 11/2003 | Park et al. | |
| 2004/0102245 A1 | 5/2004 | Escalera et al. | |
| 2005/0190183 A1 * | 9/2005 | Barone et al. | 345/427 |
| 2005/0264651 A1 | 12/2005 | Saishu et al. | |
| 2006/0188144 A1 | 8/2006 | Sasaki et al. | |
| 2006/0227132 A1 | 10/2006 | Jang et al. | |
| 2006/0232584 A1 | 10/2006 | Utsugi et al. | |
| 2008/0007559 A1 * | 1/2008 | Kalaiah et al. | 345/501 |

FOREIGN PATENT DOCUMENTS

| | | |
|---|---|---|
| EP | 0465036 A2 | 1/1992 |
| EP | 1321894 A2 | 6/2003 |
| WO | 9926198 | 5/1999 |

* cited by examiner

Primary Examiner — Kee M Tung
Assistant Examiner — Jwalant Amin

(57) ABSTRACT

Processing graphics data for display on a stereoscopic display. In one example embodiment, a method of processing graphics data for display on a stereoscopic display includes several acts. First, a first projection matrix call from a graphics application to a graphics library is intercepted. Next, it is determined that the first projection matrix call produces a perspective projection matrix. Then, the first projection matrix call is forwarded to the graphics library. Next, a first drawing call with a first viewpoint from the graphics application to the graphics library is intercepted. Then, a second drawing call with a second viewpoint is generated. Next, a third drawing call with a third viewpoint is generated. Finally, the second and third drawing calls are forwarded to the graphics library.

18 Claims, 5 Drawing Sheets

PROCESSING GRAPHICS DATA FOR A STEREOSCOPIC DISPLAY

THE FIELD OF THE INVENTION

The invention relates to stereoscopic displays. More specifically, embodiments of the invention relate to processing graphics data for display on a stereoscopic display.

BACKGROUND

In order for a three-dimensional (3D) scene to be presented on a stereoscopic display, multiple two-dimensional (2D) projections of the scene, each from a slightly different viewpoint, must be generated. For example, two 2D projections may be generated of a 3D scene, one with a left viewpoint and one with a right viewpoint.

Conventionally, real-time graphics applications, such as video game software applications, must include custom stereoscopic rendering code in order to generate multiple 2D projections from a 3D scene. Conventional real-time graphics applications must therefore be specifically built to be compatible with stereoscopic rendering.

One difficulty encountered in stereoscopic rendering is encountered when rendering a scene that includes both 3D content as well as 2D content. With reference now to FIG. 1, an example scene 100 from a conventional video game is disclosed. As disclosed in FIG. 1, the scene 100 includes 3D content such as human characters 102, vehicles 104, and a building 106. The scene 100 also includes 2D content consisting of a head up display (HUD) 108 that is superimposed over the 3D content of the scene 100. The HUD 108 shows how many points and lives a player has accumulated and how much time remains before the game terminates.

A conventional real-time graphics application can inherently distinguish between 2D content and 3D content in a scene. Where such an application includes custom stereoscopic rendering code, therefore, the application can simply generate a single 2D projection of known 2D content and generate multiple 2D projections of known 3D content. These projections are then sent to a graphics library, which facilitates the rendering of the projections on the stereoscopic display.

One difficulty in integrating custom stereoscopic rendering code into a conventional real-time graphics application is making the application compatible with a variety of different stereoscopic display. Achieving compatibility can be difficult because each manufacturer's stereoscopic display may have its own distinct set of rendering requirements. Therefore, custom stereoscopic rendering code must have to be provided for each manufacturer's stereoscopic display. The cost and complexity of a graphics application therefore increases as the amount of custom stereoscopic rendering code increases. Broad compatibility with a variety of stereoscopic displays can therefore be prohibitively expensive.

In addition, where a new stereoscopic display is produced subsequent to the release of the graphics application, compatibility with the new stereoscopic display will require the graphics application to be updated with new stereoscopic rendering code that is customized for the new stereoscopic display. The cost of such updating to a graphics application for compatibility with a new stereoscopic display can also be prohibitively expensive.

SUMMARY OF EXAMPLE EMBODIMENTS

In general, example embodiments relate to processing graphics data for display on a stereoscopic display. Example embodiments disclosed herein enable 3D graphics data from a graphic application to be modified for display on a stereoscopic display without modifying the graphics application.

In a first example embodiment, a method of processing graphics data for display on a stereoscopic display includes several acts. First, a first projection matrix call from a graphics application to a graphics library is intercepted. Next, it is determined that the first projection matrix call produces a perspective projection matrix. Then, the first projection matrix call is forwarded to the graphics library. Next, a first drawing call with a first viewpoint from the graphics application to the graphics library is intercepted. Then, a second drawing call with a second viewpoint is generated. Next, a third drawing call with a third viewpoint is generated. Finally, the second and third drawing calls are forwarded to the graphics library.

In a second example embodiment, a method of processing graphics data for display on a stereoscopic display includes several acts. First, a first drawing call with a first viewpoint from a graphics application to a graphics library is intercepted. Next, all vertices of a polygon of the first drawing call are transformed through a projection matrix. Then, it is determined that not all Z coordinates of the transformed vertices of the polygon are within a predetermined threshold of each other. Next, a second drawing call with a second viewpoint is generated. Then, a third drawing call with a third viewpoint is generated. Finally, the second and third drawing calls are forwarded to the graphics library.

In a third example embodiment, one or more computer-readable media have computer-readable instructions thereon which, when executed, implement the method of processing graphics data for display on a stereoscopic display discussed above in connection with the first example embodiment.

In a fourth example embodiment, one or more computer-readable media have computer-readable instructions thereon which, when executed, implement the method of processing graphics data for display on a stereoscopic display discussed above in connection with the second example embodiment.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF EXAMPLE EMBODIMENTS

In general, example embodiments relate to processing graphics data for display on a stereoscopic display. Example embodiments disclosed herein enable 3D graphics data from a graphic application to be modified for display on a stereoscopic display without modifying the graphics application.

Example embodiments disclosed herein include using an interceptor that is graphics library-based instead of graphics software application-based. The interceptor can be positioned between any real-time graphics software application and the graphics library that is used by the real-time graphics software application. Example graphics libraries include OpenGL and Direct3D, but the example embodiments disclosed herein are not limited to these example graphics libraries.

The real-time graphics software applications use the graphics library to render scenes from the software application. The interceptor can be a separate piece of software, such as a file, that can be executed simultaneously with a graphics software application in order to modify the calls by the application so that the image that is ultimately output by the graphics library is compatible with a particular stereoscopic display or display device. The interceptor-based embodiments disclosed herein are less costly and burdensome to the producers of graphics software applications and video drivers because such applications and drivers need not be modified in order to be made compatible with a particular stereoscopic display. Software applications that are produced to be compatible only with traditional non-stereoscopic displays can thus be made compatible with a variety of different stereoscopic or autostereoscopic displays without modifying the software applications, or their corresponding non-stereoscopic video drivers in any way.

Figure 2:
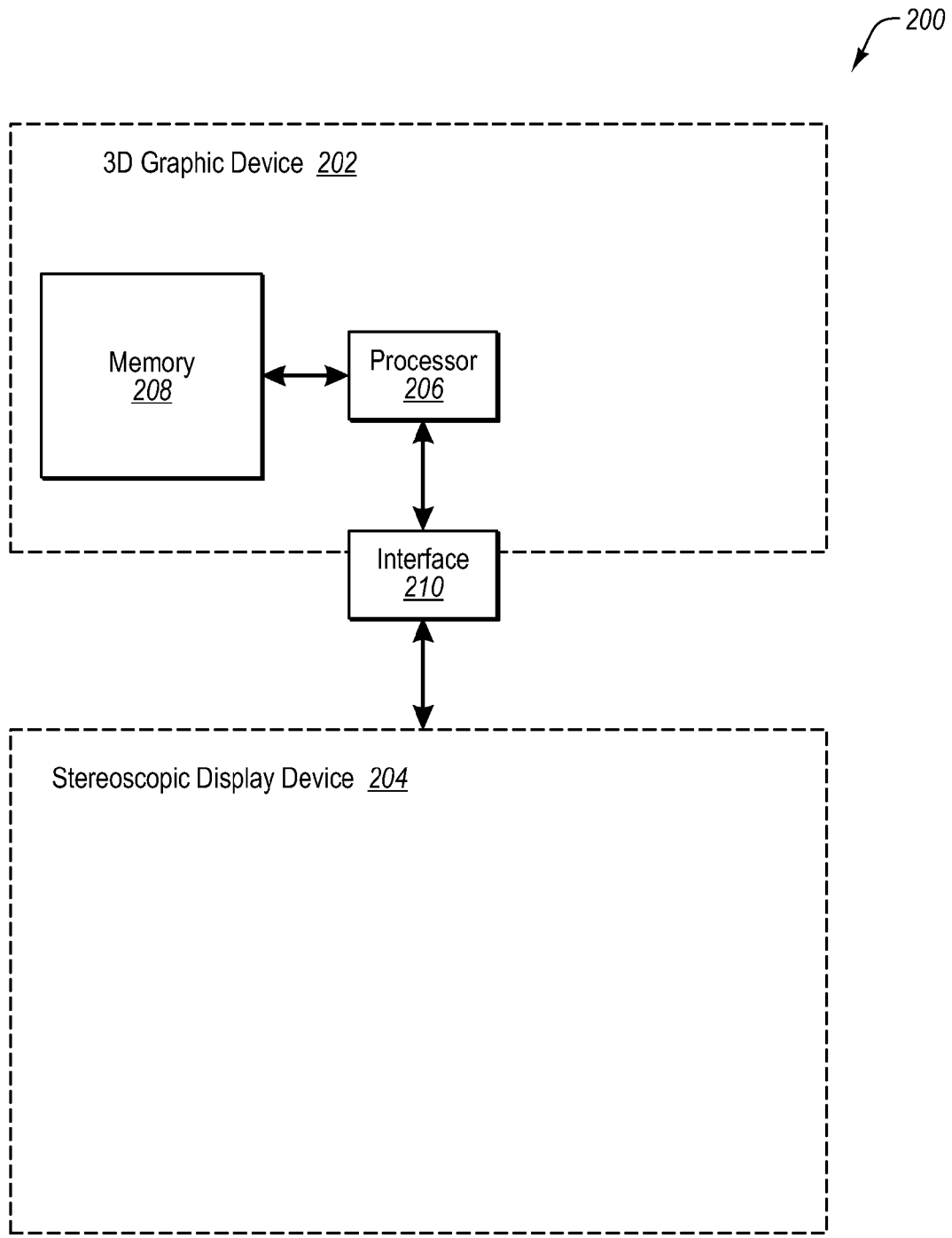
FIG. 2 is a schematic representation of an example 3D graphics device and an example stereoscopic display device.

With reference now to FIG. 2, an example environment 200 is disclosed in which the example methods disclosed herein can be implemented. The example environment 200 includes an example 3D graphics device 202 and an example stereoscopic display device 204.

In general, the example 3D graphics device 202 can be any general purpose or special purpose computer. Examples of general purpose computers include, but are not limited to, desktop computers, laptop computers, and servers. Special purpose computers include, but are not limited to, video game consoles such as the Nintendo Wii and DS Lite and Game Boy Micro and Game Boy Advance SP, Microsoft Xbox 360 and Xbox 360 Elite, and the Sony PlayStation 3 and PSP 2000.

Figure 1:
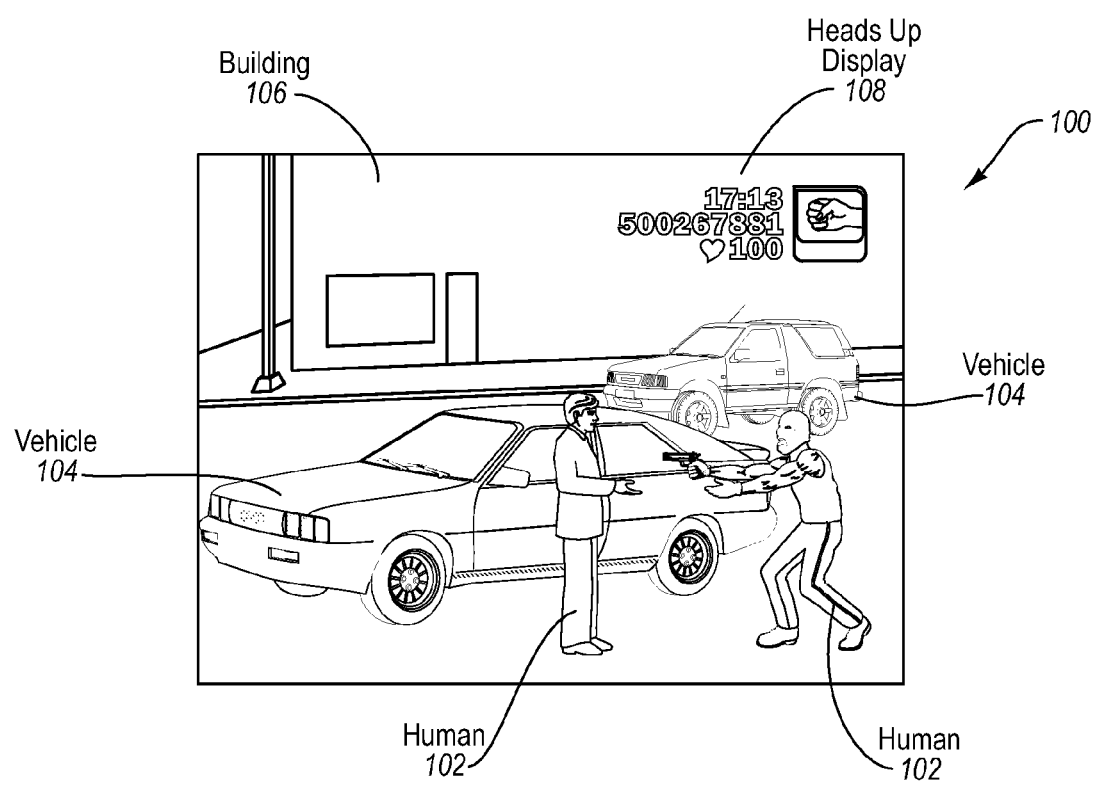
FIG. 1 is an example scene from a conventional video game.

As disclosed in FIG. 1, the example 3D graphics device 202 includes a processor 206, a memory 208, and an intervening interface 210. The processor 206 is in communication with both the memory 208 and the interface 210. The processor 206 can exchange data with the example stereoscopic display device 204 by way of the intervening interface 210. For example, 3D graphics data generated by the 3D graphics device 202 can be sent to the example stereoscopic display device 204 to be displayed on the stereoscopic display device 204.

In general, the memory 208 can be any computer-readable media for carrying or having computer-executable instructions or data structures stored thereon. Such computer-readable media can be any available media that can be accessed by the processor 206. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by the processor 206. Combinations of the above should also be included within the scope of computer-readable media.

Computer-executable instructions comprise, for example, instructions and data which cause the processor 206 to perform a certain function or group of functions. Although the example methods disclosed herein are described in language specific to methodological acts, it is to be understood that the subject matter defined in the appended claims is not necessarily limited to the specific acts described herein. Rather, the specific acts described herein are disclosed as example forms of implementing the claims.

The processor 206 uses computer-executable instructions stored in the memory 208, for example, to perform a certain function or group of functions, such as the example methods disclosed herein. Where a 3D graphics application and a graphics library are stored in the memory 208, for example, the processor 206 can implement the methodological acts of the 3D graphics application to generate calls to the graphics library. In response, the graphics library will generate a 2D image that the processor 206 will send through the intervening interface 210 for display on the stereoscopic display device 204.

In general, the example stereoscopic display device 204 can be any device capable of creating the illusion of depth in a 2D image displayed on the example stereoscopic display device 204. As disclosed in FIG. 2, the example stereoscopic display device 204 can receive 2D images from the 3D graphics device 202. The illusion of depth in an image from the 3D graphics device is generally created by presenting a slightly different image to each eye of a user.

The example stereoscopic display device 204 may also be an autostereoscopic display device. For example, the example stereoscopic display device 204 may be substantially similar to the image device 1 disclosed in United States Patent Publication No. 2006-0209371 A1, filed Feb. 14, 2006, the disclosure of which is incorporated herein by reference in its entirety.

It is understood that the example methods disclosed herein are not limited to implementation in the example environment 200, and could instead be implemented in other environments. For example, the example methods disclosed herein can be implemented in a stand-alone stereoscopic device which combines the elements of the 3D graphics device 202 and the stereoscopic display device 204. The example methods disclosed herein can be implemented in other environments capable of executing a software application, an interceptor, and graphics library, as disclosed herein.

Figure 3:
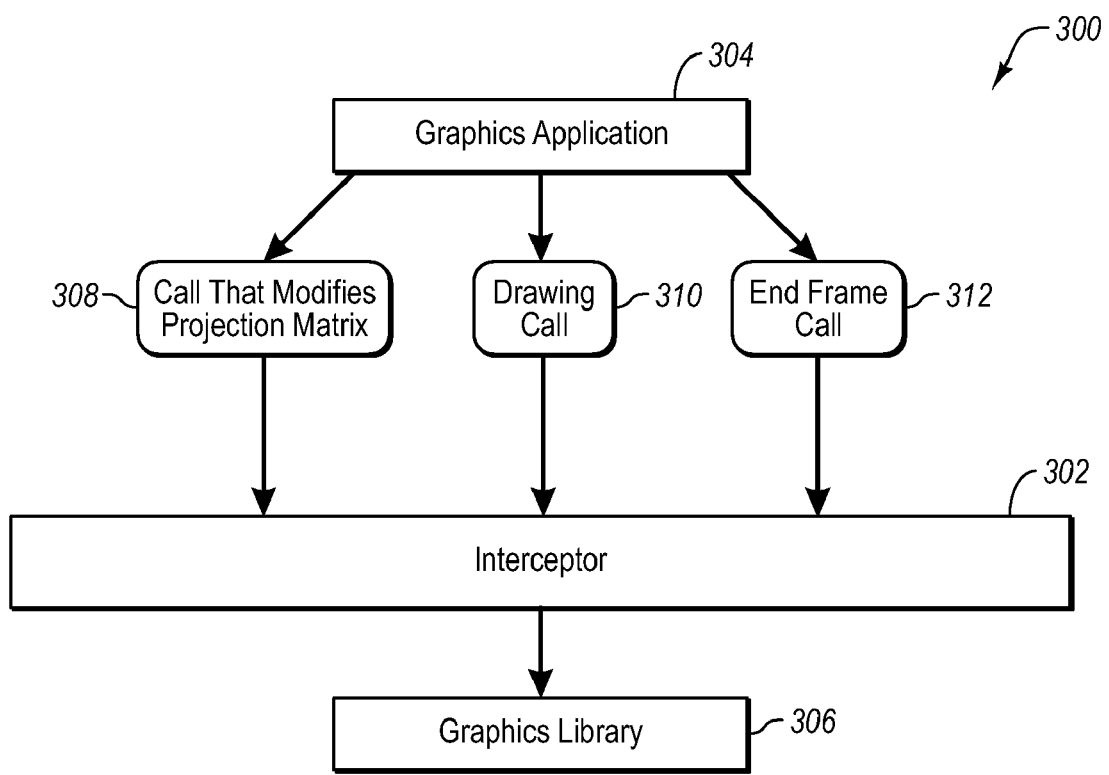
FIG. 3 is a schematic representation of an example interceptor positioned between an example graphics application and an example graphics library.

With reference now to FIG. 3, an example interceptor 302 positioned between an example graphics application 304 and an example graphics library 306 is disclosed. Each of the interceptor 302, the graphics application 304, and the example graphics library 306 may be stored and executed on a single 3D graphics device, such as the example 3D graphic device 202 of FIG. 2.

The example methods disclosed herein can be implemented by the interceptor 302. The interceptor 302 can intercept calls from the graphics application 304 to the graphics library 306. The interceptor 302 generally distinguishes between 3D content in a scene (such as the human characters 102, vehicles 104, and building 106 of the example scene 100 of FIG. 1) and 2D content in the scene (such as the HUD 108 of the example scene 100 of FIG. 1) in order to modify only the 3D content in the scene for stereoscopic display. By using the interceptor 302, any real-time graphics application can be made to be compatible with a stereoscopic display without modifying the source code of the application. As disclosed in FIG. 3, the interceptor 302 will trap on all calls that modify the projection matrix 308, all drawing calls 310, and all End Frame calls (if double buffering is used, this call may be the SwapBuffers call of OpenGL). Trapping on End Frame calls enables the interceptor 302 to perform any blending operations, and display device specific operations. The interceptor 302 can also make use of one frame buffer to render the multiple viewpoint images.

Figure 4A:
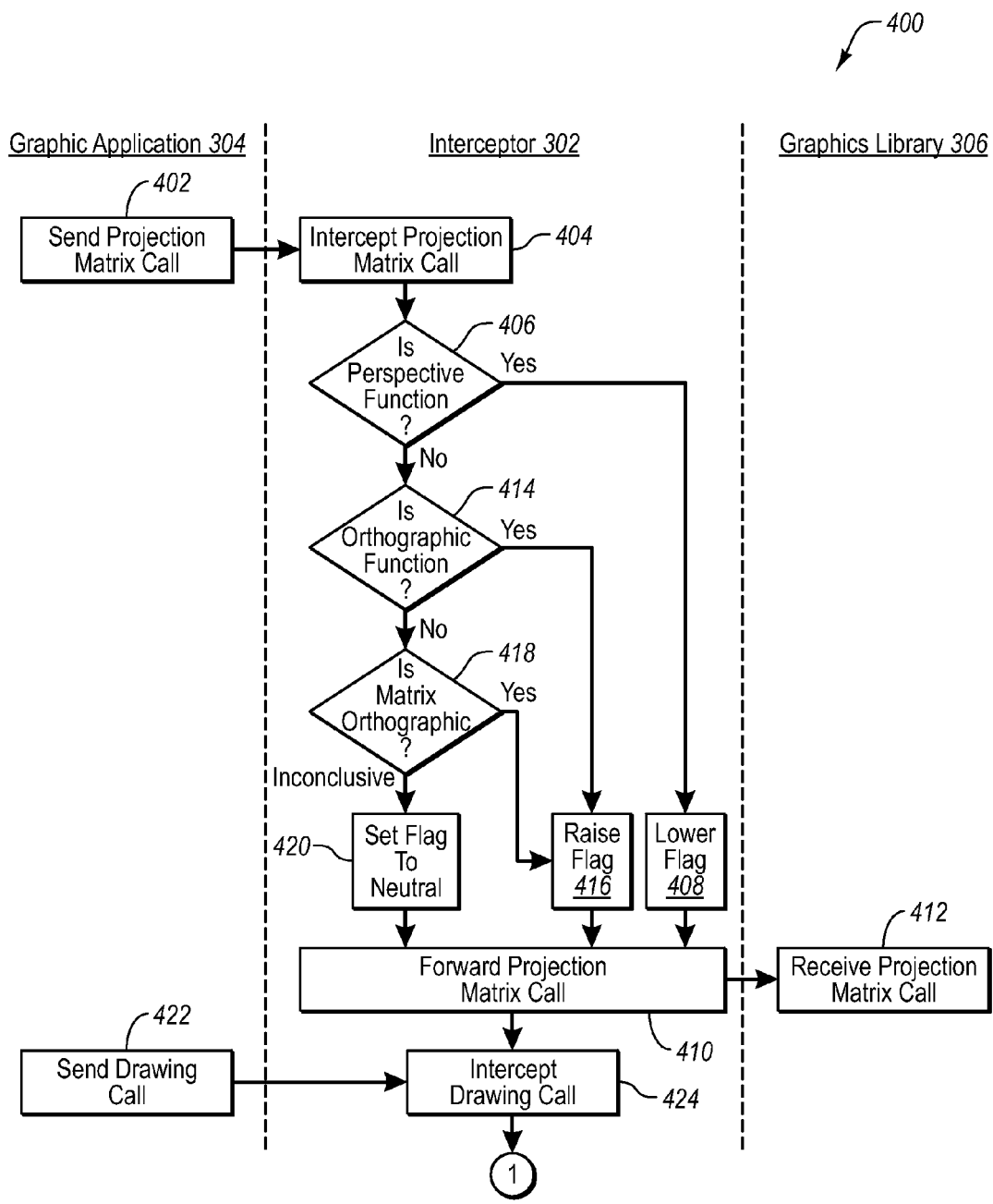
FIG. 4 (comprising 4A and 4B) is a flowchart of an example method of processing graphics data for display on a stereoscopic display.
Figure 4B:
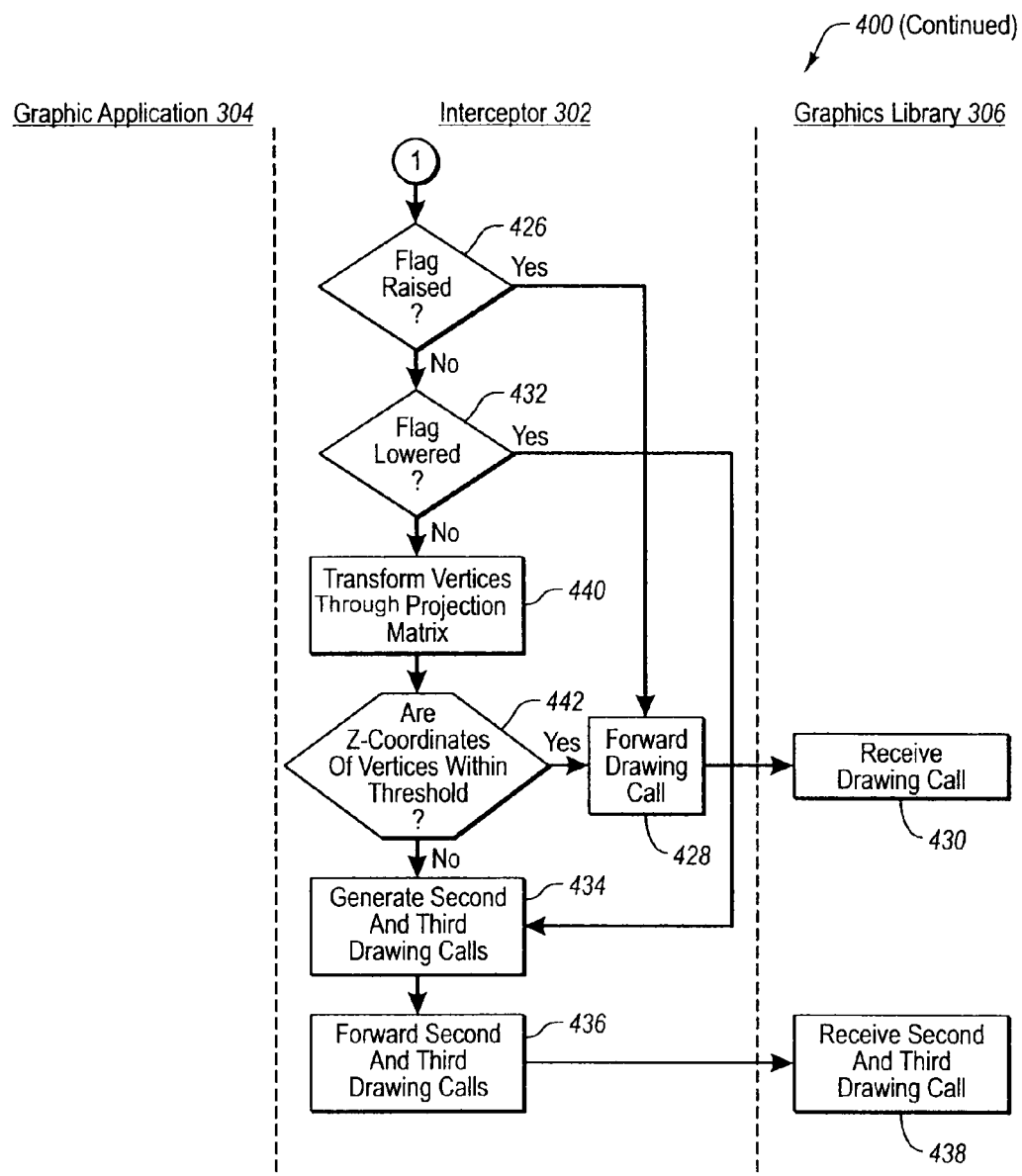

With reference now to FIG. 4, an example method 400 of processing graphics data for display on a stereoscopic display is disclosed. The example method 400 will now be discussed in connection with FIG. 3.

At 402, the graphics application 304 sends a projection matrix call 308 to the graphics library 306. At 404, the interceptor 302 intercepts projection matrix call 308.

At 406, the interceptor 302 determines whether the projection matrix call 308 is a call to a perspective function of the graphics library 306. For example, where the graphics library 306 is OpenGL, the interceptor 302 may determine whether the projection matrix call 308 is a call to the perspective function glFrustum. If the interceptor 302 determines that the projection matrix call 308 is a call to a perspective function of the graphics library 306, then the interceptor 302 proceeds to the act 408 of lowering an orthographic flag. The interceptor 302 then proceeds to the act 410 of forwarding the projection matrix call 308 to the graphics library 306. At 412, the graphics library 306 receives the unmodified projection matrix call 308.

If, however, the interceptor 302 determines that the projection matrix call 308 is not a call to a perspective function of the graphics library 306, then the interceptor 302 proceeds to the act 414 of determining whether the projection matrix call 308 is a call to an orthographic function of the graphics library 306. For example, where the graphics library 306 is OpenGL, the interceptor 302 may determine whether the projection matrix call 308 is a call to the orthographic function glOrtho. If the interceptor 302 determines that the projection matrix call 308 is a call to an orthographic function of the graphics library 306, then the interceptor 302 proceeds to the act 416 of raising the orthographic flag. The interceptor 302 then proceeds to the act 410 of forwarding the projection matrix call 308 to the graphics library 306 and, at 412, the graphics library 306 receives the unmodified projection matrix call 308.

If, however, the interceptor 302 determines that the projection matrix call 308 is neither a call to a perspective function nor an orthographic function of the graphics library 306, then the interceptor 302 proceeds to the act 418 of testing a projection matrix generated as a result of the projection matrix call 308 to determine whether the projection matrix is an orthographic projection matrix. For example, where the graphics library 306 is OpenGL, the projection matrix call 308 may be a call to one of a variety of other functions that modify the projection matrix including, but not limited to, glLoadIdentity, glLoadMatrix, glMultMatrix, glRotate, glTranslate, or glScale.

If the interceptor 302 determines after testing that the projection matrix is an orthographic projection matrix, then the interceptor 302 proceeds to the act 416 and raises the orthographic flag. The interceptor 302 then proceeds to the act 410 of forwarding the projection matrix call 308 to the graphics library 306 and, at 412, the graphics library 306 receives the unmodified projection matrix call 308.

If, however, the interceptor 302 is determines after testing that it is inconclusive whether the projection matrix is an orthographic projection matrix, then the interceptor 302 proceeds to the act 420 and sets the flag to neutral. The interceptor 302 then proceeds to the act 410 of forwarding the projection matrix call 308 to the graphics library 306 and, at 412, the graphics library 306 receives the unmodified projection matrix call 308.

Subsequently, at act 422, a drawing call 310 is sent by the graphics application 304 to the graphics library 306. Like the projection matrix call 308 above, the drawing call 310 is similarly intercepted at act 424 by the interceptor 302. The drawing call 310 has a first viewpoint. The first viewpoint may be, for example, the viewpoint of the example scene 100 disclosed in FIG. 1.

At act 426, the interceptor 302 determines whether the orthographic flag is raised. If the interceptor 302 determines that the orthographic flag is raised, then the interceptor 302 proceeds to the act 428 of forwarding the unmodified drawing call 310 to the graphics library 306. At 430, the graphics library receives the unmodified drawing call 310.

If, however, the interceptor 302 determines that the orthographic flag is not raised, then the interceptor 302 proceeds to the act 432 of determining whether the orthographic flag is lowered. If the orthographic flag is lowered, then the interceptor 302 proceeds to the act 434 of generating a second drawing call with a second viewpoint and generating a third drawing call with a third viewpoint. For example, the second viewpoint may be slightly left of the first viewpoint and the third viewpoint may be slightly right of the first viewpoint.

The generation of the second viewpoint may be accomplished, for example, by mapping a Z coordinate of each vertex of a polygon of the drawing call 310 from a range of −1 to 1 to a range of 0 to 1, multiplying each mapped Z coordinate by a first separation value to calculate the offset value of the vertex, and modifying the X and Y coordinates of each vertex as a function of the corresponding offset value of the vertex to place the vertex in the second viewpoint. The first separation value in this example may cause the second viewpoint to be a viewpoint that is shifted slightly left of the first viewpoint. The generation of the third viewpoint may be accomplished, for example, in a similar manner to the generation of the second viewpoint, except that a second separation value may be used to cause the third viewpoint to be a viewpoint that is shifted slightly right of the first viewpoint.

After the interceptor 302 generates the second and third drawing calls at act 434, the interceptor 302 proceeds to the act 436 of forwarding the second and third drawing calls to the graphics library. At the act 438, the graphics library receives the second and third drawing calls.

If, however, the interceptor 302 determines that the orthographic flag is neither raised nor lowered, the interceptor 302 proceeds to the act 440 of transforming all vertices of a polygon of the drawing call 310 through a projection matrix. Then, at the act 442, the interceptor 302 determines whether all Z coordinates of the transformed vertices of the polygon are within a predetermined threshold of each other. If the interceptor 302 determines that all Z coordinates of the transformed vertices of the polygon are within a predetermined threshold of each other, then the interceptor 302 proceeds to the act 428 described above, which results in the act 430 described above.

If, however, the interceptor 302 determines that all Z coordinates of the transformed vertices of the polygon are not within a predetermined threshold of each other, then the interceptor 302 proceeds to the acts 434 and 436 described above, which result in the act 438 described above.

The example embodiments disclosed herein may be embodied in other specific forms. The example embodiments disclosed herein are to be considered in all respects only as illustrative and not restrictive.

What is claimed is:

1. A method of processing graphics data for display on a stereoscopic display, the method comprising the acts of:
    a) intercepting a first projection matrix call from a graphics application to a graphics library;
    b) determining that the first projection matrix call produces a perspective projection matrix;
    c) forward the first projection matrix call to the graphics library;
    d) intercepting a first drawing call with a first viewpoint from the graphics application to the graphics library;
    e) generating a second drawing call with a second viewpoint;
    f) generating a third drawing call with a third viewpoint; and
    g) forwarding the second and third drawing calls to the graphics library; and wherein
    the act e) comprises the acts of:
        mapping a Z coordinate of each vertex of a polygon of the first drawing call from a range of −1 to 1 to a range of 0 to 1;
        multiplying each mapped Z coordinate by a first separation value to calculate the offset value of the vertex; and
        modifying the X and Y coordinates of each vertex as a function of the corresponding offset value of the vertex to place the vertex in the second viewpoint; and
    the act f) comprises the acts of:
        mapping a Z coordinate of each vertex of a polygon of the first drawing call from a range of −1 to 1 to a range of 0 to 1;
        multiplying each mapped Z coordinate by a second separation value to calculate the offset value of the vertex; and
        modifying the X and Y coordinates of each vertex as a function of the corresponding offset value of the vertex to place the vertex in the third viewpoint.

2. The method as recited in claim 1, wherein the act b) comprises determining that the first projection matrix call is a call to a perspective function of the graphics library.

3. The method as recited in claim 2, wherein the graphics library is OpenGL and the perspective function is glFrustum.

4. The method as recited in claim 1, wherein the second viewpoint is left of the first viewpoint and the third viewpoint is right of the first viewpoint.

5. The method as recited in claim 1, further comprising the acts of:
    h) intercepting a second projection matrix call from the graphics application to the graphics library;
    i) determining that the second projection matrix call produces an orthographic projection matrix;
    j) intercepting a fourth drawing call with the first viewpoint from the graphics application to the graphics library; and
    k) forwarding the fourth drawing call to the graphics library.

6. The method as recited in claim 5, wherein the act i) comprises determining that the second projection matrix call is a call to an orthographic function of the graphics library.

7. The method as recited in claim 6, wherein the graphics library is OpenGL and the perspective function is glOrtho.

8. The method as recited in claim 5, wherein the act i) comprises testing a projection matrix generated as a result of the second projection matrix call and determining that the projection matrix is an orthographic projection matrix.

9. The method as recited in claim 8, wherein the graphics library is OpenGL and the second projection matrix call is one of glLoadIdentity, glLoadMatrix, glMultMatrix, glRotate, glTranslate, or glScale.

10. A method of processing graphics data for display on a stereoscopic display, the method comprising the acts of:
    a) intercepting a first drawing call with a first viewpoint from a graphics application to a graphics library;
    b) transforming all vertices of a polygon of the first drawing call through a projection matrix;
    c) determining that not all Z coordinates of the transformed vertices of the polygon are within a predetermined threshold of each other;
    d) generating a second drawing call with a second viewpoint;
    e) generating a third drawing call with a third viewpoint; and
    f) forwarding the second and third drawing calls to the graphics library; and wherein
    the act d) comprises the acts of:
        mapping a Z coordinate of each vertex of a polygon of the first drawing call from a range of −1 to 1 to a range of 0 to 1;
        multiplying each mapped Z coordinate by a first separation value to calculate the offset value of the vertex; and
        modifying the X and Y coordinates of each vertex as a function of the corresponding offset value of the vertex to place the vertex in the second viewpoint; and
    the act e) comprises the acts of:
        mapping a Z coordinate of each vertex of a polygon of the first drawing call from a range of −1 to 1 to a range of 0 to 1;
        multiplying each mapped Z coordinate by a second separation value to calculate the offset value of the vertex; and
        modifying the X and Y coordinates of each vertex as a function of the corresponding offset value of the vertex to place the vertex in the third viewpoint.

11. The method as recited in claim 10, wherein the second viewpoint is left of the first viewpoint and the third viewpoint is right of the first viewpoint.

12. The method as recited in claim 10, further comprising the acts of:
    g) intercepting a fourth drawing call with a first viewpoint from a graphics application to a graphics library;
    h) transforming all vertices of a polygon of the fourth drawing call through a projection matrix;
    i) determining that all Z coordinates of the transformed vertices of the polygon are within a predetermined threshold of each other; and
    j) forwarding the fourth drawing call to the graphics library.

13. One or more non-transitory computer-readable media having computer-readable instructions thereon which, when executed, implement a method of processing graphics data for display on a stereoscopic display, the method comprising the acts of:
- a) intercepting a first projection matrix call from a graphics application to a graphics library;
- b) determining that the first projection matrix call produces a perspective projection matrix;
- c) forwarding the first projection matrix call to the graphics library;
- d) intercepting a first drawing call with a first viewpoint from the graphics application to the graphics library;
- e) generating a second drawing call with a second viewpoint;
- f) generating a third drawing call with a third viewpoint; and
- g) forwarding the second and third drawing calls to the graphics library; and wherein the act e) comprises the acts of:
- mapping a Z coordinate of each vertex of a polygon of the first drawing call from a range of −1 to 1 to a range of 0 to 1;
- multiplying each mapped Z coordinate by a first separation value to calculate the offset value of the vertex; and
- modifying the X and Y coordinates of each vertex as a function of the corresponding offset value of the vertex to place the vertex in the second viewpoint; and the act f) comprises the acts of:
- mapping a Z coordinate of each vertex of a o on of the first drawing call from a range of −1 to 1 to a range of 0 to 1;
- multiplying each mapped Z coordinate by a second separation value to calculate the offset value of the vertex; and
- modifying the X and Y coordinates of each vertex as a function of the corresponding offset value of the vertex to place the vertex in the third viewpoint.

14. A real-time 3D graphics device comprising:
a processor; and
one or more computer-readable media as recited in claim 13, the one or more computer-readable media having computer-readable instructions thereon which are configured to be executed by the processor.

15. The real-time 3D graphics device as recited in claim 14, wherein the real-time 3D graphics device comprises a dedicated video-game machine.

16. One or more non-transitory computer-readable media having computer-readable instructions thereon which, when executed, implement a method of processing graphics data for display on a stereoscopic display, the method comprising the acts of:
- a) intercepting a first drawing call with a first viewpoint from a graphics application to a graphics library;
- b) transforming all vertices of a polygon of the first drawing call through a projection matrix;
- c) determining that not all Z coordinates of the transformed vertices of the polygon are within a predetermined threshold of each other;
- d) generating a second drawing call with a second viewpoint;
- e) generating a third drawing call with a third viewpoint; and
- f) forwarding the second and third drawing calls to the graphics library; and wherein the act d) comprises the acts of:
mapping a Z coordinate of each vertex of a polygon of the first drawing call from a range of −1 to 1 to a range of 0 to 1;
multiplying each mapped Z coordinate by a first separation value to calculate the offset value of the vertex; and
modifying the X and Y coordinates of each vertex as a function of the corresponding offset value of the vertex to place the vertex in the second viewpoint; and the act e) comprises the acts of:
mapping a Z coordinate of each vertex of a polygon of the first drawing call from a range of −1 to 1 to a range of 0 to 1;
multiplying each mapped Z coordinate by a second separation value to calculate the offset value of the vertex; and
modifying the X and Y coordinates of each vertex as a function of the corresponding offset value of the vertex to place the vertex in the third viewpoint.

17. A real-time 3D graphics device comprising:
a processor; and
one or more computer-readable media as recited in claim 16, the one or more computer-readable media having computer-readable instructions thereon which are configured to be executed by the processor.

18. The real-time 3D graphics device as recited in claim 17, wherein the real-time 3D graphics device comprising a dedicated video-game machine.

* * * * *